(12) United States Patent
Li et al.

(10) Patent No.: US 11,443,438 B2
(45) Date of Patent: Sep. 13, 2022

(54) NETWORK MODULE AND DISTRIBUTION METHOD AND APPARATUS, ELECTRONIC DEVICE, AND STORAGE MEDIUM

(71) Applicant: SHENZHEN SENSETIME TECHNOLOGY CO., LTD., Shenzhen (CN)

(72) Inventors: Yi Li, Shenzhen (CN); Zhanghui Kuang, Shenzhen (CN); Yimin Chen, Shenzhen (CN); Wei Zhang, Shenzhen (CN)

(73) Assignee: SHENZHEN SENSETIME TECHNOLOGY CO., LTD., Guangdon (CN)

( * ) Notice: Subject to any disclaimer, the term of this patent is extended or adjusted under 35 U.S.C. 154(b) by 358 days.

(21) Appl. No.: 16/888,931

(22) Filed: Jun. 1, 2020

(65) Prior Publication Data
US 2020/0294249 A1    Sep. 17, 2020

Related U.S. Application Data

(63) Continuation of application No. PCT/CN2019/114460, filed on Oct. 30, 2019.

(30) Foreign Application Priority Data

Feb. 25, 2019  (CN) .......................... 201910139007.4

(51) Int. Cl.
*G06T 7/00*     (2017.01)
*G06T 7/246*    (2017.01)
(Continued)

(52) U.S. Cl.
CPC ............... *G06T 7/246* (2017.01); *G06N 3/04* (2013.01); *G06T 7/35* (2017.01); *G06T 2207/20084* (2013.01)

(58) Field of Classification Search
CPC . G06T 7/246; G06T 7/35; G06T 2207/20084; G06N 3/04; G06N 3/063;
(Continued)

(56) References Cited

U.S. PATENT DOCUMENTS

| 10,043,113 B1* | 8/2018 | Kim ..................... G06V 10/454 |
| 2019/0057507 A1* | 2/2019 | El-Khamy ........... G06K 9/6274 |

FOREIGN PATENT DOCUMENTS

| CN | 102156881 A | 8/2011 |
| CN | 103200242 A | 7/2013 |

(Continued)

OTHER PUBLICATIONS

"Principle of Neuron Algorithm Microsoft Neural Network Algorithm (SSAS)"; Jan. 2017; reprinted from the Internet at: https://blog.csdn.net/tropicofcancer9/article/details/54692718; tropicofcancer9; 3 pgs.

(Continued)

*Primary Examiner* — Ping Y Hsieh
(74) *Attorney, Agent, or Firm* — Cooper Legal Group, LLC

(57) ABSTRACT

A distribution method includes: distributing, when multiple feature maps exist in an image processing model, to each feature map a neuron through which the feature map passes; filtrating, according to importance of neurons of multiple convolution layers in an image processing model, the neurons to obtain a first result; collecting, according to a position attribute of the each neuron in the first result, statistics on a scale of the feature map corresponding to each neuron to obtain a distribution relationship; the distribution relationship indicates a correspondence between the each feature map and the neuron through which the feature map (Continued)

passes; and distributing, according to the distribution relationship, to the each feature map the neuron through which the feature map passes.

20 Claims, 6 Drawing Sheets

(51) Int. Cl.
*G06T 7/35* (2017.01)
*G06N 3/04* (2006.01)

(58) Field of Classification Search
CPC ........ G06N 3/0454; G06N 3/08; G06N 3/082; G06K 9/6268
See application file for complete search history.

(56) References Cited

FOREIGN PATENT DOCUMENTS

| CN | 107766292 A | 3/2018 |
|---|---|---|
| CN | 107871136 A | 4/2018 |
| CN | 108154192 A | 6/2018 |
| CN | 108229497 A | 6/2018 |
| CN | 108416307 A | 8/2018 |
| CN | 108830185 A | 11/2018 |
| CN | 109376667 A | 2/2019 |
| CN | 109902738 A | 6/2019 |
| JP | 2019028073 A | 2/2019 |

OTHER PUBLICATIONS

"Feature Pyramid Networks for Object Detection"; Apr. 2017; Tsung-Yi Lin, Piotr Dollar; Ross Girshick; Kaiming He; Bharath Hariharan and Serge Belongie; Computer Vision and Pattern Recognition; Reprinted from the Internet at: http://arxiv.org/abs/1612.03144; 10 pgs.

International Search Report in the international application No. PCT/CN2019/114460, dated Feb. 12, 2020, 2 pgs.

First Office Action of the Chinese application No. 201910139007.4, dated Jul. 15, 2020, 18 pgs.

"Data-Driven Neuron Allocation for Scale Aggregation Networks", Jun. 2019; Yi Li, Zhanghui Kuang, Yimin Chen and Wayne Zhang; 2019 IEEE/CVF Conference on Computer Vision and Pattern Recognition (CVPR); pp. 11526-11534.

Notice of Allowance of the Chinese application No. 201910139007.4, dated Jun. 28, 2021, 5 pgs.

First Office Action of the Japanese application No. 2020-527741, dated Aug. 3, 2021, 12 pgs.

"Spatial Pyramid Pooling in Deep Convolutional Networks for Visual Recognition", Apr. 2015, Kaiming He, Xiangyu Zhang, Shaoqing Ren and Jian Sun, Computer Science, Computer Vision and Pattern Recognition, 14 pgs.

* cited by examiner

NETWORK MODULE AND DISTRIBUTION METHOD AND APPARATUS, ELECTRONIC DEVICE, AND STORAGE MEDIUM

CROSS-REFERENCE TO RELATED APPLICATION

This is a continuation application of International Patent Application No. PCT/CN2019/114460, filed on Oct. 30, 2019, which claims priority to Chinese Patent Application No. 201910139007.4, filed with the Chinese Patent Office on Feb. 25, 2019 and entitled "NETWORK MODULE AND DISTRIBUTION METHOD AND APPARATUS, ELECTRONIC DEVICE, AND STORAGE MEDIUM". The contents of International Patent Application No. PCT/CN2019/114460 and Chinese Patent Application No. 201910139007.4 are incorporated herein by reference in their entireties.

BACKGROUND

Computer vision is an important part of artificial intelligence, while picture classification is a basis of the computer vision. Therefore, a good classification network can be used as a backbone network to perform tasks such as support, segmentation, and tracking. In recent years, feature aggregation becomes a very effective design method for a visual recognition network.

SUMMARY

The present disclosure relates to the field of computer vision technologies, and in particular, to a network module and a distribution method and apparatus, an electronic device, and a storage medium.

The present disclosure provides a network module and a distribution method and apparatus, an electronic device, and a storage medium.

According to one aspect of the present disclosure, provided is a network module, including:

a first network layer, a second network layer, and a third network layer that are cascaded sequentially;

where the first network layer is configured to process an inputted image to obtain a first feature map;

the second network layer includes multiple parallel branches;

each branch of the multiple parallel branches includes a first sampling layer;

the first sampling layer is configured to perform down-sampling on the first feature map to obtain a second feature map;

where scales of second feature maps obtained by first sampling layers in different branches of the multiple parallel branches are different;

the third network layer is configured to merge feature map data outputted by the each branch.

According to one aspect of the present disclosure, further provided is a distribution method, configured to distribute, when multiple feature maps exist in an image processing model, to each feature map a neuron through which the feature map passes, where the image processing model includes at least one network module according to any one of the above; the method includes:

filtrating, according to importance of neurons of multiple convolution layers in the image processing model, the neurons to obtain a first result;

where the multiple convolution layers are located at a same depth of the image processing model, and the multiple convolution layers are respectively configured to process the feature maps of different scales;

the first result includes multiple neurons;

collecting, according to a position attribute of the each neuron in the first result, statistics on a scale of the feature map corresponding to each neuron to obtain a distribution relationship;

where the position attribute characterizes a convolution layer to which the each neuron belongs;

the distribution relationship characterizes a correspondence between the each feature map and the neuron through which the feature map passes; and distributing, according to the distribution relationship, to the each feature map the neuron through which the feature map passes.

According to one aspect of the present disclosure, further provided is a distribution apparatus, configured to distribute, when multiple feature maps exist in an image processing model, to each feature map a neuron through which the feature map passes, where the image processing model includes at least one network module according to any one of the above; the apparatus includes:

a filtrating module, configured to filtrate, according to importance of neurons of multiple convolution layers in the image processing model, the neurons to obtain a first result;

where the multiple convolution layers are located at a same depth of the image processing model, and the multiple convolution layers are respectively configured to process the feature maps of different scales;

the first result includes multiple neurons;

a statistic module, configured to collect, according to a position attribute of the each neuron in the first result, statistics on a scale of the feature map corresponding to each neuron to obtain a distribution relationship;

where the position attribute characterizes a convolution layer to which the each neuron belongs;

the distribution relationship characterizes a correspondence between the each feature map and the neuron through which the feature map passes; and a distribution module, configured to distribute, according to the distribution relationship, to the each feature map the neuron through which the feature map passes.

According to one aspect of the present disclosure, further provided is an electronic device, including:

a processor; and a memory configured to store processor-executable instructions;

where the processor is configured to execute the method according to any one of the above.

According to one aspect of the present disclosure, provided is a computer-readable storage medium, having computer program instructions stored thereon, where when the computer program instructions are executed by a processor, the foregoing distribution method is implemented.

According to one aspect of the present disclosure, provided is a computer program, including a computer-readable code, where the computer-readable code runs in an electronic device, a processor in the electronic device executes the foregoing distribution method.

BRIEF DESCRIPTION OF DRAWINGS

The accompanying drawings herein, which are incorporated in and constitute a part of the specification, illustrate embodiments consistent with the present disclosure and, together with the specification, serve to explain the technical solutions of the present disclosure.

DETAILED DESCRIPTION

Figure 1:
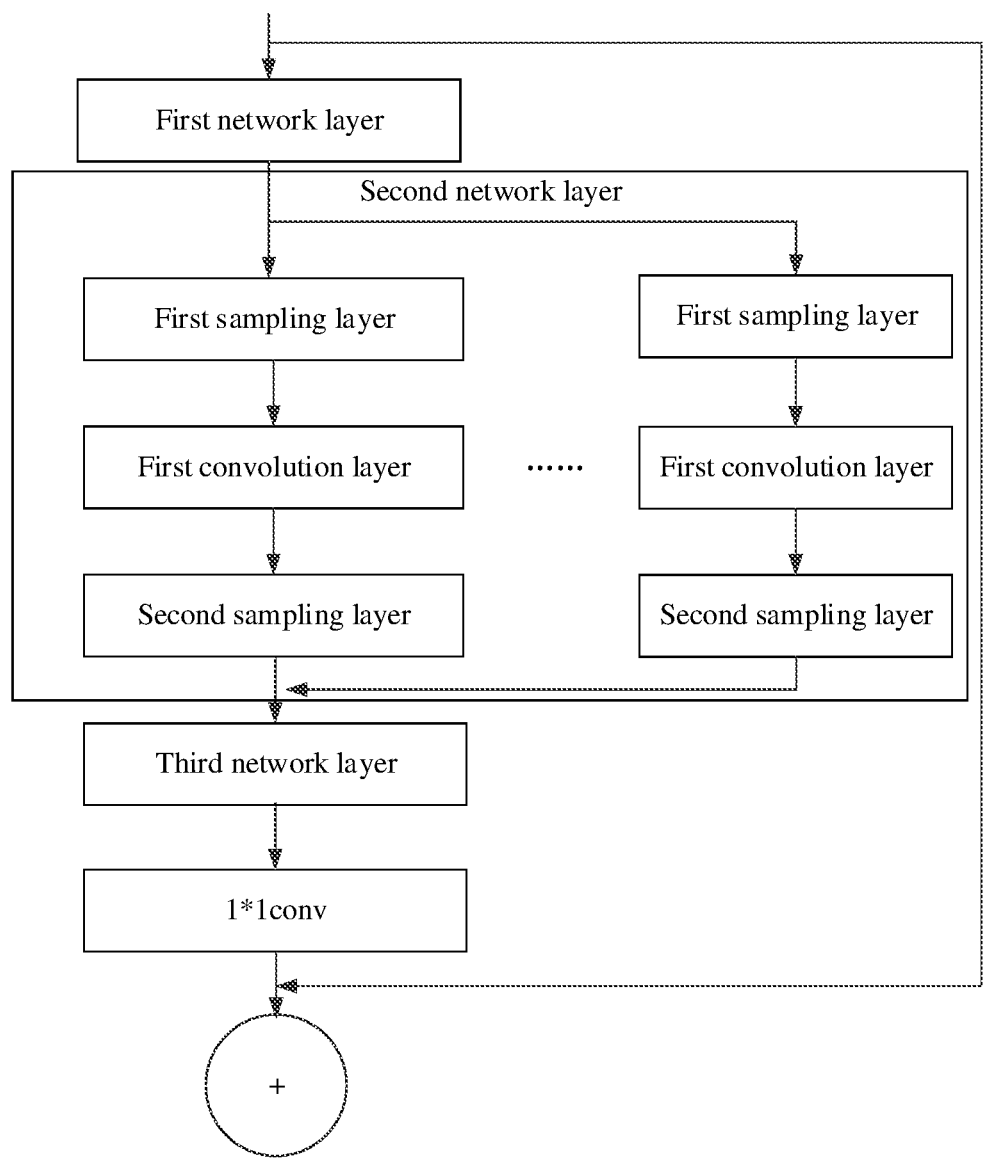
FIG. 1 illustrates a schematic structural diagram of a network module according to embodiments of the present disclosure.

In embodiments of the present disclosure, a network module is provided, multiple parallel branches are constructed in a second network layer in the network module, and a first sampling layer in each branch performs downsampling on a first feature map outputted by a first network layer, so that different first sampling layers construct second feature maps having different scales, so as to achieve the purpose of directly constructing multiple feature maps of different scales in the network module.

It should be understood that the above general description and the following detailed description are merely exemplary and explanatory, and are not intended to limit the present disclosure.

The other features and aspects of the present disclosure can be described more clearly according to the detailed descriptions of the exemplary embodiments in the accompanying drawings.

Various exemplary embodiments, features, and aspects of the present disclosure are described below in detail with reference to the accompanying drawings. The same reference numerals in the accompanying drawings represent elements having the same or similar functions. Although the various aspects of the embodiments are illustrated in the accompanying drawings, unless stated particularly, it is not required to draw the accompanying drawings in proportion.

The special term "exemplary" herein means "used as examples, embodiments, or descriptions". Any embodiment herein illustrated by the term "exemplary" is not necessarily construed as being superior to or better than other embodiments.

The term "and/or" as used herein is merely an association relationship describing associated objects, indicating that there may be three relationships, for example, A and/or B, which may indicate that A exists separately, both A and B exist, and B exists separately. In addition, the term "at least one" as used herein means any one of multiple elements or any combination of at least two of the multiple elements, for example, including at least one of A, B, or C, which indicates that any one or more elements selected from a set consisting of A, B, and C are included.

In addition, numerous details are given in the following detailed description for the purpose of better explaining the present disclosure. A person skilled in the art should understand that the present disclosure can still be implemented even without some of those details. In some examples, methods, means, elements, and circuits that are well known to a person skilled in the art are not described in detail so that the principle of the present disclosure becomes apparent.

FIG. 1 illustrates a schematic structural diagram of a network module according to embodiments of the present disclosure.

Referring to FIG. 1, the network module according to the embodiments of the present disclosure includes a first network layer, a second network layer, and a third network layer that are cascaded sequentially. The first network layer is configured to process an inputted image to obtain a first feature map. The second network layer includes multiple parallel branches, and each branch includes a first sampling layer. The first sampling layer is configured to perform downsampling on the first feature map to obtain a second feature map. Scales of second feature maps obtained by first sampling layers in different branches are different. The third network layer is configured to merge feature map data outputted by the each branch so that a next-stage network layer of the third network layer can continue to perform an image processing operation. It should be noted herein that the third network layer may be a concatenation layer.

Hence, a network module is provided, multiple parallel branches are constructed in a second network layer in the network module, and a first sampling layer in each branch performs downsampling on a first feature map outputted by a first network layer, so that different first sampling layers construct second feature maps having different scales, so as to achieve the purpose of directly constructing multiple feature maps of different scales in the network module.

Compared with the related art, by means of two modes of connecting different depths of feature maps and applying different convolution kernels at the same depth of a network, in the network module according to the embodiments of the present disclosure, feature maps of different scales can be directly constructed by means of the first sampling layers in the branches, that is, feature maps of various scales are constructed by means of a downsampling operation, so that feature maps of various different scales can be constructed according to actual conditions by adopting the network module according to the embodiments of the present disclosure. Therefore, this effectively improves the diversity of feature maps, and the scale variation range of the obtained feature maps can be larger and more diverse. Moreover, the multi-branch setting also brings more diverse receptive field, so that the network module can effectively improve the precision of classification and detection when applied to classification and detection tasks.

It should be noted that, the number of branches provided in the second network layer of the network module can be specifically set according to actual conditions. For example, the number of branches may be two, three, or five, ten or the like. That is to say, in the network module according to the embodiments of the present disclosure, the number of branches in the second network layer can be determined according to the specific amount of calculation. Therefore, the number of branches is not limited herein.

In addition, it should be further noted that the scale of the feature map mentioned in the embodiments of the present disclosure may be the physical size of the feature map, or may be the size of an effective portion of the image (for example, although the physical size of the image is the same, the pixel values of some of pixels of the image is processed by, but not limited to, the approaches such as zeroing, the portion constituted by the pixels other than the processed pixels is equivalent to the effective portion, and the size of the effective portion is smaller with respect to the physical size of the image), etc. However, no limitation is made thereto.

In a possible implementation, the first sampling layer may be a pooling layer, or may be another network layer which can perform various operations (such as zooming in and zooming out) on an image. That is to say, as long as the first sampling layer can process the first feature map, so that the second feature map obtained after processing can have a different scale. This also effectively improves the structural flexibility of the network module according to the embodiments of the present disclosure, so as to construct the network module more conveniently.

Figure 2:
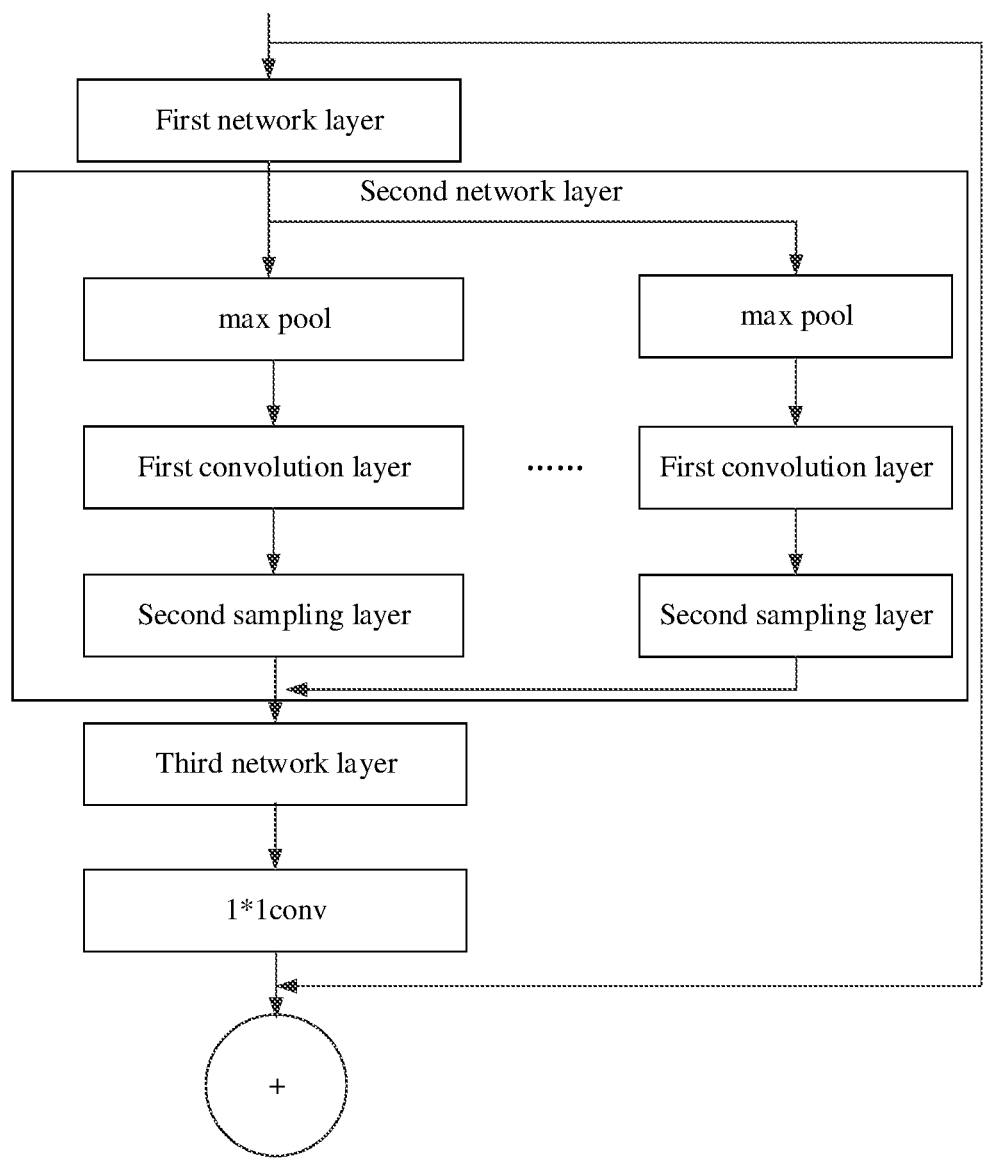
FIG. 2 illustrates a schematic structural diagram of a network module according to another embodiment of the present disclosure.

FIG. 2 illustrates a schematic structural diagram of a network module according to another embodiment of the present disclosure.

Referring to FIG. 2, in a possible implementation, a pooling layer may be a maximum pooling layer (max pool) when a first sampling layer is a pooling layer. That is, the first sampling layer is achieved by the maximum pooling layer. A first network layer may be a convolution layer, the convolution kernel of the convolution layer may have a size of 1*1 (that is, a 1*1 convolution layer). Hence, a corresponding first feature map is obtained after an inputted image is processed by the first network layer (for example, a 1*1 convolution layer). In this case, the first feature map has a first scale. Then, downsampling (that is, maximum pooling processing is performed on the first feature map by the maximum pooling layer) is performed on the first feature map having the first scale by the first sampling layer (for example, a maximum pooling layer) of each branch in the second network layer, to obtain the second feature map having a different scale, so as to achieve the purpose of directly constructing feature maps having different scales in the network module.

Downsampling is performed on the first feature map by using the maximum pooling layer as the first sampling layer. Because the maximum pooling can effectively reduce the size of the feature map, so that the subsequent image processing operations (such as a convolution operation) in the branch corresponding to a small scale consume a smaller amount of calculation, thereby also effectively reducing the amount of calculation in each branch, and reducing power consumption.

In a possible implementation, the each branch further includes a first convolution layer and a second sampling layer that are cascaded sequentially with the first sampling layer. The first convolution layer is configured to perform a convolution operation on the second feature map to obtain a third feature map. It should be noted herein that the first convolution layer may be a convolution layer having a convolution kernel of a different size (for example, a 3*3 convolution layer, 3*3conv). Moreover, the sizes of the convolution kernels of the first convolution layers in the branches may be the same, or may be different. The second sampling layer is configured to restore a scale of the third feature map to a scale of the first feature map. It should be noted that the second sampling layer may be an upsampling layer.

That is to say, downsampling is performed on the first feature map in each first sampling layer, and after second feature maps having different scales are obtained, the convolution operation is performed on the second feature maps having different scales by means of the first convolution layer to achieve convolution processing for the feature maps.

Moreover, because of the downsampling operation on the first feature map by the first sampling layer, the scale of the obtained second feature map changes with respect to the first feature map, while in each branch, the scale of the third feature map obtained by performing the convolution operation on the second feature map by means of the first convolution layer may also change with respect to the scale of the second feature map. Therefore, in order to be able to perform other image processing smoothly, in this case, an upsampling operation is further required to be performed on the third feature map by the second sampling layer, so that the scale of the third feature map is restored to an original scale (that is, the scale of the first feature map).

Hence, the network module according to the embodiments of the present disclosure achieves the construction of feature maps of different scales by means of upsampling and downsampling operations, so as to effectively and efficiently extract multi-scale features.

Figure 3:
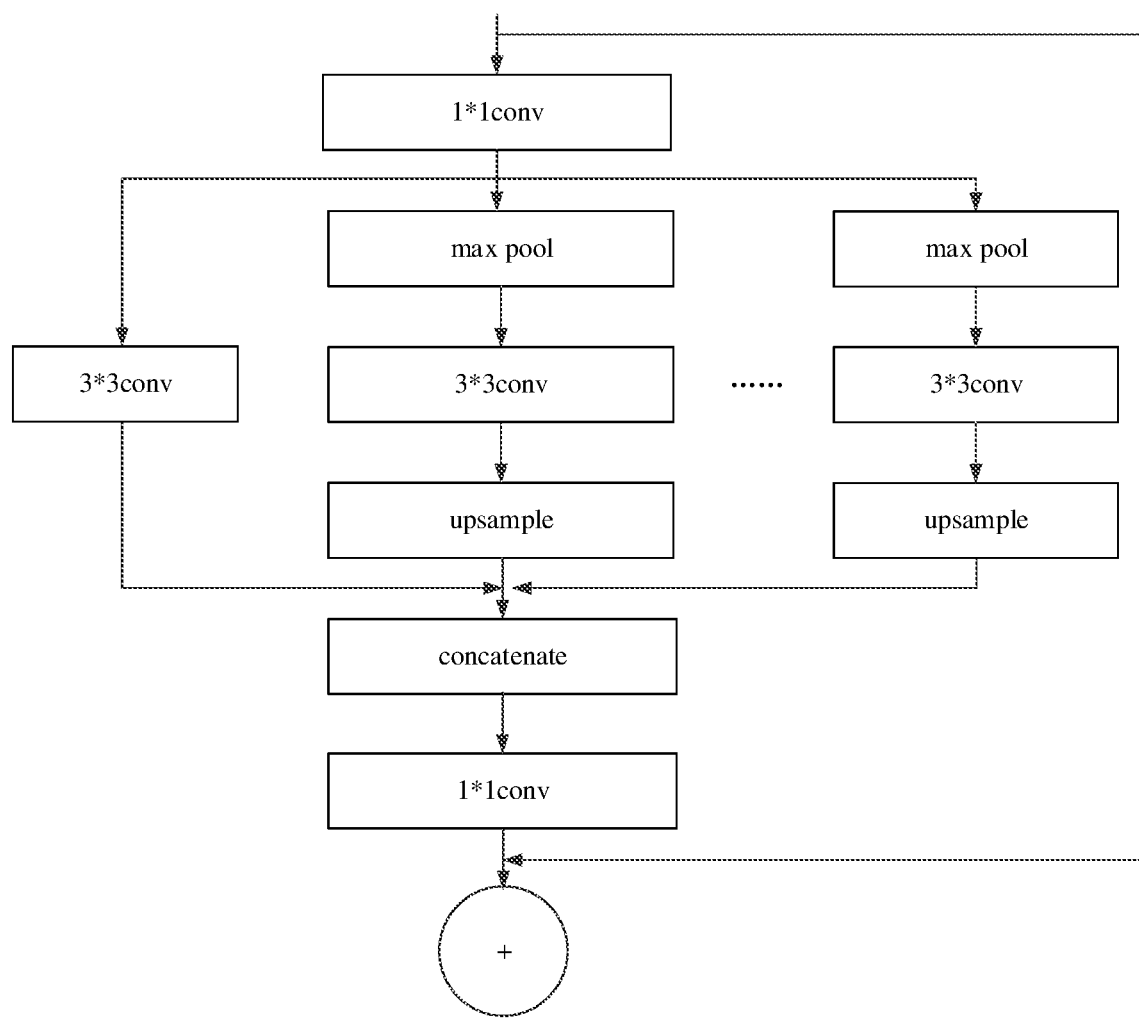
FIG. 3 illustrates a schematic structural diagram of a network module according to still another embodiment of the present disclosure.

FIG. 3 illustrates a schematic structural diagram of a network module according to still another embodiment of the present disclosure.

Referring to FIG. 3, in the network module according to the embodiments of the present disclosure, a second network layer may further include an original proportional branch. A parallel relationship exists between the original proportional branch and multiple parallel branches as described above, and the original proportional branch does not change the scale of a first feature map. The original proportional branch includes a second convolution layer. The second convolution layer is configured to perform a convolution operation on the first feature map, and input feature map data obtained by means of the convolution operation into a third network layer, and feature data obtained by means of convolution is the same as the scale of the first feature map. It should be noted herein that the second convolution layer may be a 3*3 convolution layer (that is, 3*3conv). Correspondingly, the third network layer is further configured to merge feature map data outputted by the multiple parallel branches in the second network layer with feature map data outputted by the original proportional branch.

That is, by providing the original proportional branch in the second network layer, and directly performing the convolution operation on the first feature map by the second convolution layer in the original proportional branch, the processing the first feature map of an original scale is further ensured while effectively increasing the scale of the feature map, thereby also improving the integrity and accuracy of processing image data, and avoiding the absence of some of features in the first feature map.

In addition, it should also be noted that, the network module according to the embodiments of the present disclosure can be used as a minimum basic unit (referred to as a block) in a neural network structure. That is, network structures having different depths may be constructed by repeatedly stacking any one of the network modules (blocks) above. The constructed network structure may be a convolutional neural network.

According to another aspect of the present disclosure, further provided is a distribution method. The distribution method according to the present disclosure is configured to distribute, when multiple feature maps exist in an image processing model, to each feature map a neuron through which the feature map passes. The feature maps have different scales. The image processing model may be a convolutional neural network model.

Figure 4:
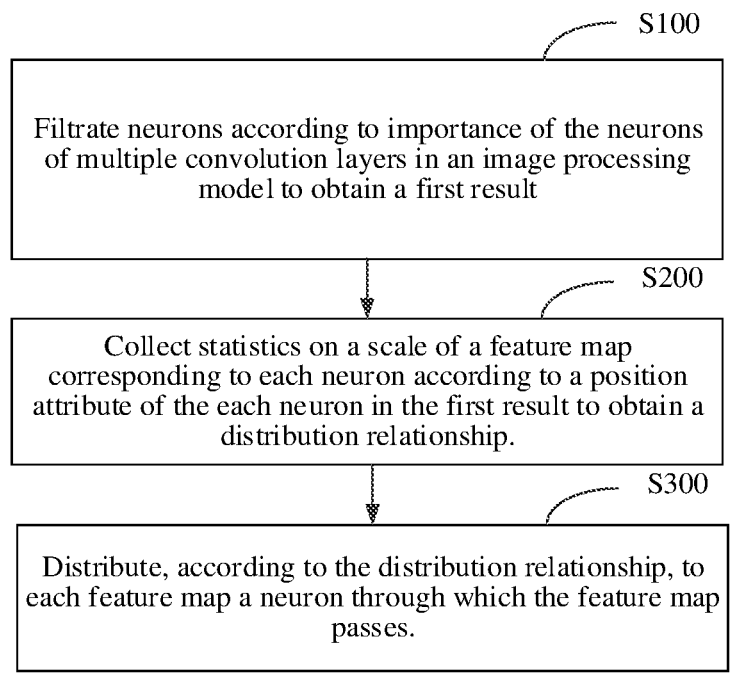
FIG. 4 illustrates a flowchart of a distribution method according to embodiments of the present disclosure.

FIG. 4 illustrates a flowchart of a distribution method according to embodiments of the present disclosure. Referring to FIG. 4, the distribution method according to the present disclosure includes the following steps.

At step S100, neurons are filtrated according to importance of the neurons of multiple convolution layers in an image processing model to obtain a first result. It should be noted that the multiple convolution layers herein are located at a same depth of the image processing model (that is, the multiple convolution layers are located on the same layer of the image processing model), and the convolution layers are respectively configured to process feature maps of different scales. Moreover, the first result includes multiple neurons.

At step S200, statistics on a scale of the feature map corresponding to each neuron are collected according to a position attribute of the each neuron in the first result to obtain a distribution relationship. The position attribute characterizes a convolution layer to which the each neuron belongs. That is to say, which convolution layer to which the neuron belongs is determined by means of the position attribute. The distribution relationship characterizes a correspondence between each feature map and the neuron through which the feature map passes. That is, it can be determined according to the distribution relationship which neurons are used to perform processing and calculation on the each feature map.

At step S300, the neuron through which the feature map passes is distributed to each feature map according to the distribution relationship.

Hence, in the distribution method according to the disclosure above, neurons are filtrated according to importance of the neurons of multiple convolution layers in an image processing model, and thus a scale of a feature map corresponding to each neuron is determined according to a position of the each neuron in a first result obtained by filtrating (i.e., determining a feature map to be processed by the teach neuron), so as to obtain a corresponding distribution relationship. Finally, distribution between each feature map and a neuron through which the feature map passes is performed according to a determined distribution relationship, so as to achieve the purpose of distributing the neuron to the each feature map based on the importance of the neurons. The distribution mode is driven by data, and distribution relationships determined for different data sets are different. Compared with the mode of setting by human experience in the related art, in the distribution method according to the embodiments of the present disclosure, the neuron finally distributed to the each feature map is more accurate.

It should be noted that the distribution method provided by the embodiments of the present disclosure may be executed by any appropriate device having data processing capability, including, but not limited to, a terminal device and a server, etc. Alternatively, the distribution method can also be executed by a processor, for example, any distribution method mentioned in the embodiments of the present disclosure is executed by the processor by invoking corresponding instructions stored in a memory. Details are not described below again. The processor may be a general-purpose processor, or may be an artificial intelligence processor.

In addition, it should also be noted that in the distribution method according to the embodiments of the present disclosure, multiple feature maps having different scales should exist in the image processing model. That is to say, the image processing model may be a first type of network structure. The first type of network structure is a network structure introducing a multi-scale feature map in the manner of combining a shallow feature map and a deep feature map by adding a residual between different depths of feature maps. The image processing model may also be a second type of network structure. The second type of network structure is a network structure introducing a multi-scale feature map by applying different convolution kernels at a same depth. The image processing model may also be a third type of network structure. The third type of network structure is a network structure including any one of the network modules (blocks) above (that is, a network structure having a certain depth constructed by repeatedly stacking the network modules).

In a possible implementation, the image processing model may include any one of the network modules above. The number of the network modules is at least one.

Hence, before filtrating the neurons according to the importance of the neurons of the multiple convolution layers in the image processing model, the distribution method further includes the following steps.

A number of branches in each network module is determined, so as to construct the network module according to a determined number of the branches in the network module. The image processing model is constructed according to a preset number of network modules. The number of the branches in each network model can be determined according to the amount of calculation required according to actual conditions.

The image processing model is trained to obtain a scale parameter of a batchnorm layer in the image processing model. The batchnorm layer is configured for normalization processing, and the scale parameter characterizes the importance of the neurons of the convolution layers in the branches in the network module.

That is, the distribution method according to the embodiments of the present disclosure can be applied to the image processing model including any one of the network modules described above. When the image processing model includes the network module, the multiple convolution layers may be the first convolution layer in the branches of the second network layer in the network module and the second convolution layer in the original proportional branch.

That is to say, when the image processing model includes any one of the network modules described above, the multiple convolution layers located at the same depth in the image processing model may be, in the network module, the first convolution layer in the branches of the second network layer and/or the second convolution layer in the original proportional branch of the second network layer.

It should also be noted herein that when the image processing model includes any one of the network modules described above, the number of the network modules is at least one. When the number of the network modules is greater than one, the distribution for the neurons is performed based on the neurons in the multiple convolution layers (for example, the first convolution layer and the second convolution layer) in each network module (block). It should also be noted that the image processing model can be constructed by sequentially stacking multiple network modules when the number of the network modules is greater than one. That is, the multiple network modules can be arranged in series, and a corresponding network layer can be further provided between every two adjacent network modules according to actual condition requirements. No specific limitation is made herein.

For example, when the image processing model includes 20 network modules (that is, the network structure having a certain depth constructed by stacking 20 blocks), the neurons in the first convolution layer in the branches of the second network layer in the 20 blocks and the second convolution layer in the original proportional branch can be filtrated and distributed respectively. The distribution processes of the neurons of multiple convolution layers in the 20 blocks can be performed at the same time and can also be performed sequentially. No limitation is made herein.

In a possible implementation, filtrating the neurons according to the importance of the neurons of the multiple convolution layers in the image processing model to obtain the first result includes the following steps.

The neurons of the multiple convolution layers are sorted according to the scale parameter of the batchnorm layer obtained by pre-training the image processing model to obtain a first sequence. The first sequence characterizes an arrangement order of the neurons of the multiple convolution layers.

A number of neurons to be used for processing the multiple feature maps is determined according to a preset amount of calculation.

Required neurons are sequentially extracted from the first sequence according to a determined number of the neurons to be used to obtain the first result.

That is, the neurons (which may be all the neurons in the multiple convolution layers herein) in the multiple convolution layers are sorted (where the arrangement order may be sequentially arranging from high to low) by using the scale parameter of the batchnorm layer learned by pre-training the image processing model as an evaluation criterium to obtain a corresponding first sequence. Moreover, the number of neurons (the number of neurons to be used) required for processing multiple feature maps is further determined according to the preset amount of calculation (that is, the amount of calculation that is actually required), and the required neurons are sequentially extracted according to the arrangement order of the neurons from the first sequence according to the determined number of the neurons to be used. The number of the extracted required neurons is consistent with the number of the neurons to be used.

Hence, the neurons of the multiple convolution layers are selected by means of the learned scale parameter, so that multiple neurons are competitively and adaptively distributed, so as to effectively improve the accuracy of the distribution of the neurons, and also effectively improve the rationality of the distribution of the neurons.

In addition, it should also be noted that the embodiments of any one of the distribution methods described above, distributing, according to the distribution relationship, to the each feature map the neuron through which the feature map passes may include: operations of retaining the required neurons and deleting unnecessary neurons.

In a possible implementation, after distributing, according to the distribution relationship, to the each feature map the neuron through which the feature map passes, the method further includes the steps.

The first network structure of the image processing model is determined according to the distribution relationship, and the image processing model of the first network structure is trained so as to achieve the purpose of optimizing the image processing model, so that the finally obtained image processing model can have higher precision in classification and detection tasks.

In order to explain more clearly the process of the distribution method according to the embodiments of the present disclosure, more clear and detailed descriptions are performed by taking the fact that the image processing model includes a network module which has the network structure shown in FIG. 3 as an example.

Referring to FIG. 3, the second network layer of the network module shown in FIG. 3 includes one original proportional branch and two branches (a first branch and a second branch). The original proportional branch, the first branch, and the second branch are arranged in parallel. The original proportional branch includes one 3*3 convolution layer (that is, the second convolution layer, 3*3conv), and the first branch and the second branch respectively include the first sampling layer (the maximum pooling layer, max pool), the first convolution layer (3*3conv), and the second sampling layer (upsample) that are cascaded sequentially. When the distribution of neurons is performed on the image processing model, the distribution of the neurons of two first convolution layers and one second convolution layer in the network module included in the image processing model is mainly performed.

It can be considered that the number of neurons in the second convolution layer in the original proportional branch is 10 (neuron 1, neuron 2, neuron 3 . . . and neuron 10 respectively), the number of the neurons of the first convolution layer in the first branch is also 10 (neuron 11, neuron 12, neuron 13 . . . and neuron 20 respectively), and the number of the neurons of the first convolution layer in the second branch may also be 10 (neuron 21, neuron 22, neuron 23 . . . , and neuron 30 respectively).

Moreover, the number of branches of the second network layer is three (the original proportional branch, the first branch, and the second branch), and therefore, the number of feature maps constructed by the branches is also three. The scale of the feature map in the original proportional branch is an original scale, the scale of the feature map constructed in the first branch is a first scale, and the scale of the feature map constructed in the second branch is a second scale.

After the scale parameter of the batchnorm layer is learned by training the image processing model, the 30 neurons are sorted according to the scale parameter to obtain one neuron sequence (i.e., the first sequence). The obtained first sequence is neuron 1, neuron 2, neuron 3, neuron 4, . . . , neuron 28, neuron 29, and neuron 30.

The number of neurons (i.e., the number of neurons to be used) required for processing the three feature maps of different scales above by the image processing model in the embodiments is determined to be 15 according to the preset amount of calculation. Therefore, in this case, the required neurons are sequentially extracted from the first sequence in the arrangement order of the neurons according to the determined number of the neurons to be used (neuron 1, neuron 2, neuron 3, neuron 4, . . . , neuron 14, and neuron 15 respectively) so as to obtain the first result.

Statistics on a scale of the feature map corresponding to each neuron are collected according to the position attribute of each neuron in the first result to obtain the distribution relationship. That is, the scale of the feature map corresponding to the each neuron is respectively determined according to the respective positions of neuron 1, neuron 2, neuron 3, neuron 4, . . . , neuron 14, and neuron 15. That is to say, which branch to which the neuron belongs is determined according to the position attribute of the each neuron. It can be determined that neuron 1 to neuron 10 belong to the original proportional branch, and the scales of the feature maps corresponding to the 10 neurons are original scales; neuron 10 to neuron 15 belong to the first branch, and the scales of the feature maps corresponding to the five neurons are first scales. Therefore, a corresponding distribution relationship can be obtained (that is, the scales of the feature maps respectively corresponding to neuron 1 to neuron 15).

The neuron through which each feature map passes is distributed according to the distribution relationship after the distribution relationship is determined. That is, neuron 1 to neuron 15 are retained, and the second branch including neuron 20 to neuron 30 is deleted. That is to say, the second branch constructing the feature map of the second scale is discarded. Hence, the distribution of neurons in the network module in the embodiments is completed.

In conclusion, in the distribution method according to the embodiments of the present disclosure, neurons are distributed to feature maps having different scales according to the importance of the neurons of multiple convolution layers located at a same depth in an image processing model, so that multiple neurons can be competitively and adaptively distributed, so as to effectively improve the accuracy and rationality of a distribution result and also optimize the network structure of the image processing model, so that the precision of classification and detection can be effectively improved when the optimized image processing model is retrained and applied to classification and detection tasks.

It may be understood that the foregoing method embodiments mentioned in the present disclosure may be combined with each other to form a combined embodiment without departing from the principle logic. Details are not described herein again due to space limitation.

A person skilled in the art may understand that, in the foregoing methods of the specific implementations, the order in which the steps are written does not imply a strict execution order which constitutes any limitation to the implementation process, and the specific order of executing the steps should be determined by functions and possible internal logics thereof.

In addition, the present disclosure further provides a distribution apparatus, an electronic device, a computer-readable storage medium, and a program, which can all be configured to implement any one of the distribution methods provided in the present disclosure. For the corresponding technical solutions and descriptions, please refer to the corresponding content in the method section. Details are not described herein again.

Figure 5:
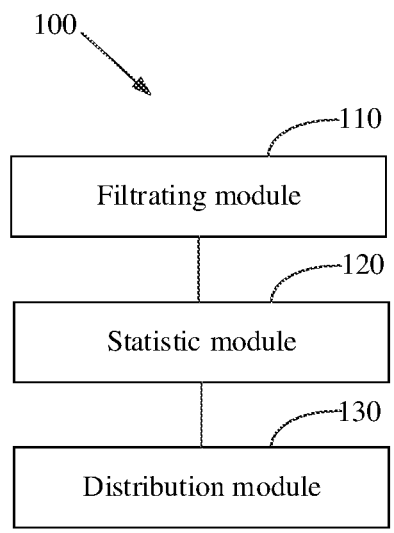
FIG. 5 illustrates a block diagram of a distribution apparatus according to embodiments of the present disclosure.

FIG. 5 illustrates a block diagram of a distribution apparatus 100 according to embodiments of the present disclosure. As shown in FIG. 5, the distribution apparatus 100 is configured to distribute, when multiple feature maps exist in an image processing model, to each feature map a neuron through which the feature map passes, where the image processing model includes at least one network module according to any one of the above; the apparatus 100 includes:

a filtrating module 110, configured to filtrate neurons according to importance of the neurons of multiple convolution layers in the image processing model to obtain a first result;

where the multiple convolution layers are located at a same depth of the image processing model, and the convolution layers are respectively configured to process the feature maps of different scales;

the first result includes multiple neurons;

a statistic module 120, configured to collect statistics on a scale of the feature map corresponding to each neuron according to a position attribute of the each neuron in the first result to obtain a distribution relationship;

where the position attribute characterizes a convolution layer to which the each neuron belongs;

the distribution relationship characterizes a correspondence between the each feature map and the neuron through which the feature map passes; and a distribution module 130, configured to distribute, according to the distribution relationship, to the each feature map the neuron through which the feature map passes.

In a possible implementation, the apparatus further includes:

a model construction module, configured to determine a number of branches in each network module, and construct the image processing model according to a preset number of network modules before the filtrating module filtrates the neurons according to the importance of the neurons of the multiple convolution layers in the image processing model; and a first training module, configured to train the image processing model to obtain a scale parameter of a batchnorm layer in the image processing model;

where the scale parameter characterizes the importance of the neurons of the convolution layers in the branches in the network module.

In a possible implementation, the filtrating module 110 includes:

a sorting sub-module, configured to sort the neurons of the multiple convolution layers according to the scale parameter of the batchnorm layer obtained by pre-training the image processing model to obtain a first sequence;

where the first sequence characterizes an arrangement order of the neurons of the multiple convolution layers;

a neuron number determination sub-module, configured to determine a number of neurons to be used for processing the multiple feature maps according to a preset amount of calculation; and a neuron extraction sub-module, configured to sequentially extract required neurons from the first sequence according to a determined number of the neurons to be used to obtain the first result.

In a possible implementation, the apparatus further includes:

a network structure determination module, configured to determine a first network structure of the image processing model according to the distribution relationship after the distribution module distributes, according to the distribution relationship, to the each feature map the neuron through which the feature map passes; and a second training module, configured to train the image processing model of the first network structure.

In some embodiments, the functions provided by or the modules included in the apparatus provided by the embodiments of the present disclosure may be used to implement the methods described in the foregoing method embodiments. For specific implementations, reference may be made to the description in the method embodiments above. For the purpose of brevity, details are not described herein again.

The embodiments of the present disclosure further provide a computer-readable storage medium, having computer program instructions stored thereon, where when the computer program instructions are executed by a processor, the foregoing any distribution method is implemented. The computer-readable storage medium may be a nonvolatile computer-readable storage medium or a volatile computer-readable storage medium.

The embodiments of the present disclosure further provide an electronic device, including: a processor; and a memory configured to store processor-executable instructions, where the processor is configured to execute the method according to any one of the above.

The embodiments of the present disclosure further provide a computer program, including a computer-readable code, where when the computer-readable code runs in an electronic device, a processor in the electronic device executes the foregoing method.

The electronic device may be provided as a terminal, a server, or a device in another form.

Figure 6:
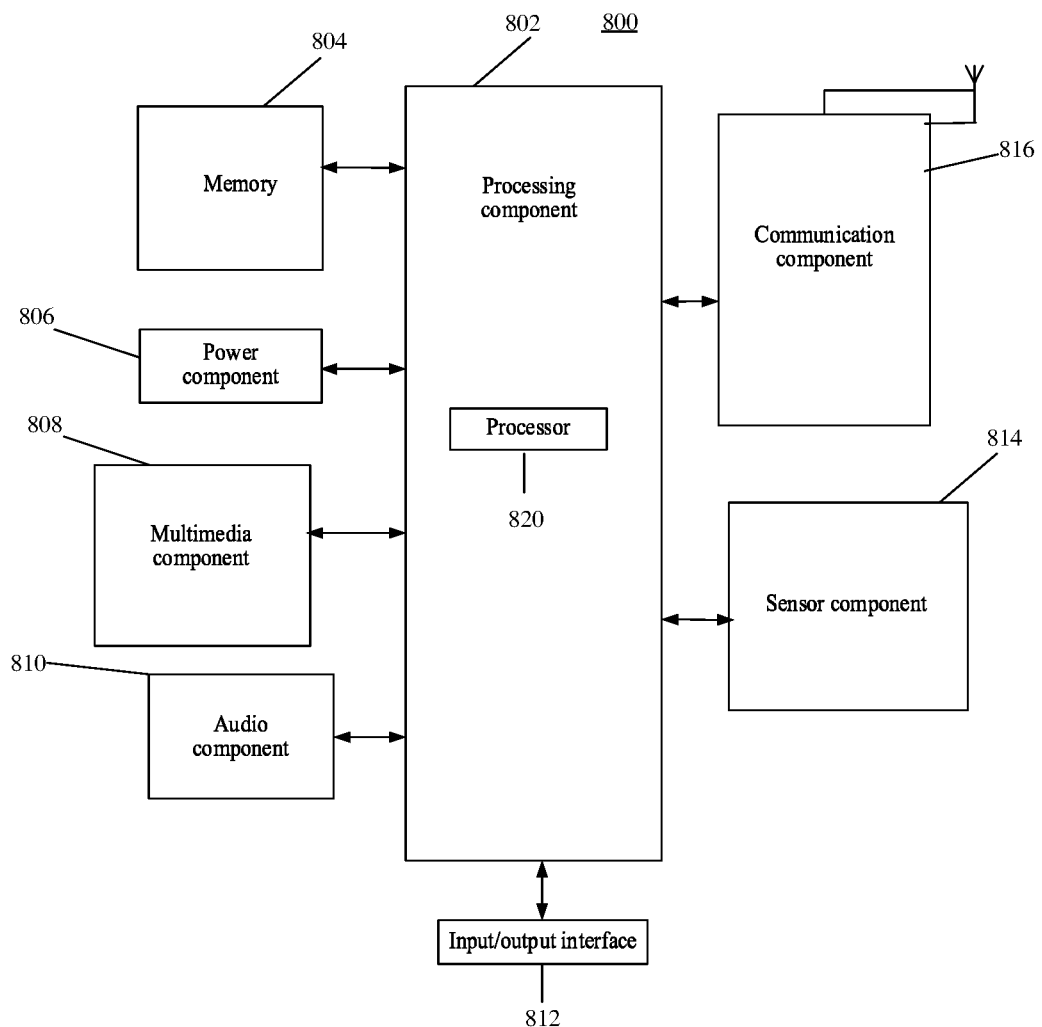
FIG. 6 illustrates a block diagram of an electronic device according to embodiments of the present disclosure.

FIG. 6 is a block diagram of an electronic device 800 according to one exemplary embodiment. For example, the electronic device 800 may be a terminal such as a mobile phone, a computer, a digital broadcast terminal, a message transceiver device, a game console, a tablet device, a medical device, exercise equipment, or a personal digital assistant.

Referring to FIG. 6, the electronic device 800 may include one or more of the following components: a processing component 802, a memory 804, a power component 806, a multimedia component 808, an audio component 810, an Input/Output (I/O) interface 812, a sensor component 814, or a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the steps of the methods above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application program or method operated on the electronic device 800, contact data, contact list data, messages, pictures, videos, etc. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power component 806 provides power for various components of the electronic device 800. The power component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel In an exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the methods above.

In an exemplary embodiment, further provided is a non-volatile computer-readable storage medium, for example, a memory 804 including computer program instructions, which can be executed by a processor 820 of the electronic device 800 to implement the methods above.

Figure 7:
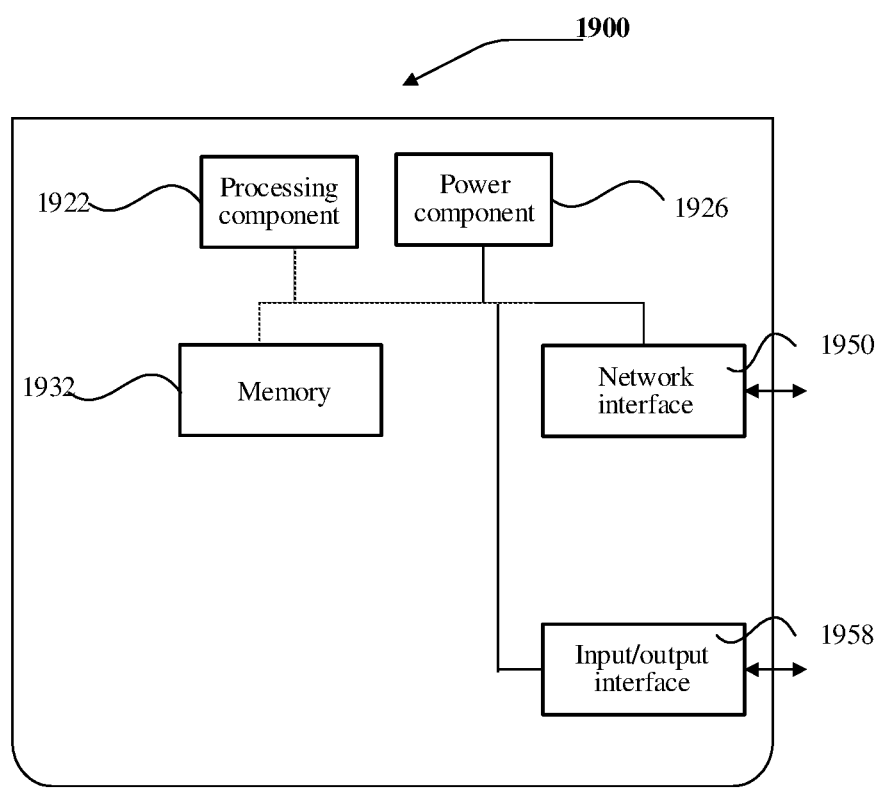
FIG. 7 illustrates a block diagram of an electronic device according to embodiments of the present disclosure.

FIG. 7 is a block diagram of an electronic device 1900 according to one exemplary embodiment. For example, the electronic device 1900 may be provided as a server. Referring to FIG. 7, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Furthermore, the processing component 1922 is configured to execute instructions so as to execute the methods above.

The electronic device 1900 may further include a power component 1926 configured to execute power management of the electronic device 1900, a wired or wireless network interface 1950 configured to connect the electronic device 1900 to a network, and an I/O interface 1958. The electronic device 1900 may be operated based on an operating system stored in the memory 1932, such as Windows Server™, Mac OS X™, Unix™, Linux™, FreeBSD™ or the like.

In an exemplary embodiment, further provided is a non-volatile computer-readable storage medium, for example, a memory 1932 including computer program instructions, which can be executed by the processing component 1922 of the electronic device 1900 to implement the methods above.

The present disclosure may be a system, a method, and/or a computer program product. The computer program product may include a computer-readable storage medium having computer-readable program instructions thereon for enabling a processor to implement aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination thereof. More specific examples (a non-exhaustive list) of the computer-readable storage medium include: a portable computer diskette, a hard disk, a Random Access Memory (RAM), an ROM, an EPROM (or a flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination thereof. A computer-readable storage medium, as used herein, is not to be construed as being transitory signals per se, such as radio waves or other freely propagating electromagnetic waves, electromagnetic waves propagating by means of a waveguide or other transmission media (e.g., light pulses passing through a fiber-optic cable), or electrical signals transmitted by means of a wire.

Computer-readable program instructions described herein can be downloaded to respective computing/processing devices from the computer-readable storage medium or to an external computer or external storage device via a network, for example, the Internet, a Local Area Network (LAN), a Wide Area Network (WAN) and/or a wireless network. The network may include copper transmission cables, optical fiber transmission, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer program instructions for performing operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" language or similar programming languages. Computer-readable program instructions can be executed completely on a user computer, executed partially on the user computer, executed as an independent software package, executed partially on the user computer and partially on a remote computer, or executed completely on the remote computer or server. In a scenario involving the remote computer, the remote computer may be connected to the user computer via any type of network, including the LAN or the WAN, or the connection may be made to an external computer (for example, connecting by using an Internet service provider via the Internet). In some embodiments, electronic circuitry including, for example, programmable logic circuitry, the FGPAs, or Programmable Logic Arrays (PLAs) may execute the computer-readable program instructions by utilizing state information of the computer-readable program instructions to personalize the electronic circuitry, so as to implement the aspects of the present disclosure.

The aspects of the present disclosure are described herein with reference to flowcharts and/or block diagrams of methods, apparatuses (systems), and computer program products according to the embodiments of the present disclosure. It should be understood that each block in the flowcharts and/or block diagrams, and combinations of the blocks in the flowcharts and/or block diagrams can be implemented by the computer-readable program instructions.

These computer-readable program instructions may be provided to a processor of a general-purpose computer, a special-purpose computer, or other programmable data processing apparatuses to produce a machine, such that the instructions, which are executed by means of the processor of the computer or other programmable data processing apparatuses, create means for implementing the functions/actions specified in one or more blocks in the flowcharts and/or block diagrams. These computer-readable program instructions may also be stored in the computer-readable storage medium, the instructions enable the computer, the programmable data processing apparatus, and/or other devices to function in a particular manner, so that the computer-readable medium having instructions stored therein includes an article of manufacture including instructions which implement the aspects of the functions/actions specified in one or more blocks of the flowcharts and/or block diagrams.

The computer-readable program instructions may also be loaded onto a computer, other programmable data processing apparatuses, or other devices to cause a series of operational steps to be performed on the computer, other programmable apparatuses or other devices to produce a computer implemented process, so that the instructions which are executed on the computer, other programmable data processing apparatuses or other devices implement the functions/actions specified in one or more blocks of the flowcharts and/or block diagrams.

The flowcharts and block diagrams in the accompanying drawings illustrate the architecture, functions and operations that may be implemented by the systems, methods, and computer program products according to multiple embodiments of the present disclosure. In this regard, each block in the flowcharts or block diagrams may represent a module, a program segment, or a portion of instruction, which includes one or more executable instructions for implementing the specified logical function. In some alternative implementations, the functions noted in the block may also occur out of the order noted in the accompanying drawings. For example, two blocks shown in succession may, in fact, be executed substantially concurrently, or the blocks may sometimes be executed in a reverse order, depending upon the functions involved. It should also be noted that each block in the block diagrams and/or flowcharts, and combinations of blocks in the block diagrams and/or flowcharts, can be implemented by special purpose hardware-based systems that perform the specified functions or actions or implemented by combinations of special purpose hardware and computer instructions.

Different embodiments in the present disclosure can be combined with each other without departing from the logic, descriptions of different embodiments have focuses, and for description portions having focuses, refer to the descriptions in other embodiments.

The descriptions according to the embodiments of the present disclosure have been presented for purposes of illustration, but are not intended to be exhaustive or limited to the embodiments disclosed. Many modifications and variations are apparent to a person of ordinary skill in the art without departing from the scope and spirit of the described embodiments. The terms used herein are chosen to best explain the principles of the embodiments, practical applications or improvement over technologies in the marketplace, or to enable other persons of ordinary skill in the art to understand the embodiments disclosed herein.

The invention claimed is:

1. A distribution method, comprising:
   distributing, when multiple feature maps exist in an image processing model, to each feature map a neuron through which the feature map passes;
   filtrating, according to importance of neurons of multiple convolution layers in an image processing model, the neurons to obtain a first result;
   wherein the multiple convolution layers are located at a same depth of the image processing model, and
   the multiple convolution layers are respectively configured to process the feature maps of different scales;
   the first result comprises multiple neurons;
   collecting, according to a position attribute of the each neuron in the first result, statistics on a scale of the feature map corresponding to each neuron to obtain a distribution relationship;
   wherein the position attribute indicates a convolution layer to which the each neuron belongs;
   the distribution relationship indicates a correspondence between the each feature map and the neuron through which the feature map passes; and
   distributing, according to the distribution relationship, to the each feature map the neuron through which the feature map passes.

2. The method according to claim 1, wherein the image processing model comprises at least one network module, and each network module comprises:
   a first network layer, a second network layer, and a third network layer that are cascaded sequentially;
   wherein the first network layer is configured to process an inputted image to obtain a first feature map;
   the second network layer comprises multiple parallel branches;
   each branch of the multiple parallel branches comprises a first sampling layer;
   the first sampling layer is configured to perform down-sampling on the first feature map to obtain a second feature map;
   wherein scales of second feature maps obtained by first sampling layers in different branches of the multiple parallel branches are different;
   the third network layer is configured to merge feature map data outputted by the each branch.

3. The method according to claim 2, wherein the first sampling layer is a pooling layer.

4. The method according to claim 3, wherein the pooling layer is a maximum pooling layer.

5. The method according to claim 2, wherein the each branch further comprises a first convolution layer and a second sampling layer that are cascaded sequentially with the first sampling layer;
   the first convolution layer is configured to perform a convolution operation on the second feature map to obtain a third feature map;
   the second sampling layer is configured to restore a scale of the third feature map to a scale of the first feature map.

6. The method according to claim 2, wherein the second network layer further comprises an original proportional branch; the original proportional branch comprises a second convolution layer;
   the second convolution layer is configured to perform a convolution operation on the first feature map, and input feature map data obtained by the convolution operation into the third network layer;
   the third network layer is further configured to merge feature map data outputted by the multiple parallel branches in the second network layer with feature map data outputted by the original proportional branch.

7. The method according to claim 1, before filtrating, according to the importance of the neurons of the multiple convolution layers in the image processing model, the neurons, further comprising:
   determining a number of branches in each network module, and constructing the image processing model according to a preset number of network modules; and
   training the image processing model to obtain a scale parameter of a batchnorm layer in the image processing model;
   wherein the scale parameter indicates the importance of the neurons of the convolution layers in the branches in the network module.

8. The method according to claim 1, wherein filtrating, according to the importance of the neurons of the multiple convolution layers in the image processing model, the neurons to obtain the first result comprises:
   sorting, according to a scale parameter of a batchnorm layer obtained by pre-training the image processing model, the neurons of the multiple convolution layers to obtain a first sequence;
   wherein the first sequence indicates an arrangement order of the neurons of the multiple convolution layers;
   determining a number of neurons to be used for processing the multiple feature maps according to a preset amount of calculation; and sequentially extracting, according to a determined number of the neurons to be used, required neurons from the first sequence to obtain the first result.

9. The method according to claim 8, after distributing, according to the distribution relationship, to the each feature map the neuron through which the feature map passes, further comprising:
determining, according to the distribution relationship, a first network structure of the image processing model; and
training the image processing model of the first network structure.

10. An electronic device, comprising:
a processor; and
a memory configured to store processor-executable instructions;
wherein when the processor-executable instructions are executed, the processor is configured to:
distribute, when multiple feature maps exist in an image processing model, to each feature map a neuron through which the feature map passes;
filtrate neurons according to importance of the neurons of multiple convolution layers in the image processing model to obtain a first result;
wherein the multiple convolution layers are located at a same depth of the image processing model, and
the multiple convolution layers are respectively configured to process the feature maps of different scales;
the first result comprises multiple neurons;
collect statistics on a scale of the feature map corresponding to each neuron according to a position attribute of the each neuron in the first result to obtain a distribution relationship;
wherein the position attribute indicates a convolution layer to which the each neuron belongs;
the distribution relationship indicates a correspondence between the each feature map and the neuron through which the feature map passes; and
distribute, according to the distribution relationship, to the each feature map the neuron through which the feature map passes.

11. The electronic device according to claim 10, wherein the image processing model comprises at least one network module, and each network module comprises:
a first network layer, a second network layer, and a third network layer that are cascaded sequentially;
wherein the first network layer is configured to process an inputted image to obtain a first feature map;
the second network layer comprises multiple parallel branches;
each branch of the multiple parallel branches comprises a first sampling layer;
the first sampling layer is configured to perform down-sampling on the first feature map to obtain a second feature map;
wherein scales of second feature maps obtained by first sampling layers in different branches of the multiple parallel branches are different;
the third network layer is configured to merge feature map data outputted by the each branch.

12. The electronic device according to claim 11, wherein the first sampling layer is a pooling layer.

13. The electronic device according to claim 12, wherein the pooling layer is a maximum pooling layer.

14. The electronic device according to claim 11, wherein the each branch further comprises a first convolution layer and a second sampling layer that are cascaded sequentially with the first sampling layer;
the first convolution layer is configured to perform a convolution operation on the second feature map to obtain a third feature map;
the second sampling layer is configured to restore a scale of the third feature map to a scale of the first feature map.

15. The electronic device according to claim 11, wherein the second network layer further comprises an original proportional branch; the original proportional branch comprises a second convolution layer;
the second convolution layer is configured to perform a convolution operation on the first feature map, and input feature map data obtained by the convolution operation into the third network layer;
the third network layer is further configured to merge feature map data outputted by the multiple parallel branches in the second network layer with feature map data outputted by the original proportional branch.

16. The electronic device according to claim 10, wherein the processor is further configured to:
determine a number of branches in each network module, and construct the image processing model according to a preset number of network modules before the processor filtrates the neurons according to the importance of the neurons of the multiple convolution layers in the image processing model;
train the image processing model to obtain a scale parameter of a batchnorm layer in the image processing model;
wherein the scale parameter indicates the importance of the neurons of the convolution layers in the branches in the network module.

17. The electronic device according to claim 10, wherein the processor is specifically configured to:
sort the neurons of the multiple convolution layers according to a scale parameter of a batchnorm layer obtained by pre-training the image processing model to obtain a first sequence;
wherein the first sequence indicates an arrangement order of the neurons of the multiple convolution layers;
determine a number of neurons to be used for processing the multiple feature maps according to a preset amount of calculation; and
sequentially extract required neurons from the first sequence according to a determined number of the neurons to be used to obtain the first result.

18. The electronic device according to claim 17, wherein the processor is further configured to:
determine a first network structure of the image processing model according to the distribution relationship after the processor distributes, according to the distribution relationship, to the each feature map the neuron through which the feature map passes; and
train the image processing model of the first network structure.

19. A non-transitory computer-readable storage medium, having computer program instructions thereon, wherein when the computer program instructions are executed by a processor, the processor is configured to perform:
distributing, when multiple feature maps exist in an image processing model, to each feature map a neuron through which the feature map passes;

filtrating, according to importance of neurons of multiple convolution layers in an image processing model, the neurons to obtain a first result;
wherein the multiple convolution layers are located at a same depth of the image processing model, and
the multiple convolution layers are respectively configured to process the feature maps of different scales;
the first result comprises multiple neurons;
collecting, according to a position attribute of the each neuron in the first result, statistics on a scale of the feature map corresponding to each neuron to obtain a distribution relationship;
wherein the position attribute indicates a convolution layer to which the each neuron belongs;
the distribution relationship indicates a correspondence between the each feature map and the neuron through which the feature map passes; and
distributing, according to the distribution relationship, to the each feature map the neuron through which the feature map passes.

20. The non-transitory computer-readable storage medium according to claim 19, wherein the image processing model comprises at least one network module, and each network module comprises:
a first network layer, a second network layer, and a third network layer that are cascaded sequentially;
wherein the first network layer is configured to process an inputted image to obtain a first feature map;
the second network layer comprises multiple parallel branches;
each branch of the multiple parallel branches comprises a first sampling layer;
the first sampling layer is configured to perform down-sampling on the first feature map to obtain a second feature map;
wherein scales of second feature maps obtained by first sampling layers in different branches of the multiple parallel branches are different;
the third network layer is configured to merge feature map data outputted by the each branch.

* * * * *